(12) United States Patent
Li et al.

(10) Patent No.: US 12,316,564 B2
(45) Date of Patent: May 27, 2025

(54) SIGNAL PROCESSING METHOD AND DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Yan Li, Beijing (CN); Fei Wang, Beijing (CN); Liang Xia, Beijing (CN); Jing Jin, Beijing (CN); Yi Zheng, Beijing (CN); Qixing Wang, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 419 days.

(21) Appl. No.: 17/756,040

(22) PCT Filed: Oct. 20, 2020

(86) PCT No.: PCT/CN2020/122103
§ 371 (c)(1),
(2) Date: May 13, 2022

(87) PCT Pub. No.: WO2021/093525
PCT Pub. Date: May 20, 2021

(65) Prior Publication Data
US 2022/0399974 A1 Dec. 15, 2022

(30) Foreign Application Priority Data
Nov. 14, 2019 (CN) .......................... 201911112299.9

(51) Int. Cl.
*H04L 5/00* (2006.01)
*H04W 72/1273* (2023.01)
(Continued)

(52) U.S. Cl.
CPC ....... *H04L 5/0051* (2013.01); *H04W 72/1273* (2013.01); *H04W 72/23* (2023.01); *H04W 92/20* (2013.01)

(58) Field of Classification Search
CPC ... H04L 5/0023; H04L 5/0048; H04L 5/0051; H04L 5/0053; H04L 2027/0093;
(Continued)

(56) References Cited

U.S. PATENT DOCUMENTS 10,637,709 B2 4/2020 Bai
2018/0205589 A1* 7/2018 Bai ..................... H04L 27/2672
(Continued)

FOREIGN PATENT DOCUMENTS

CN 109217993 A 1/2019
CN 109586880 A 4/2019
(Continued)

OTHER PUBLICATIONS

CMCC, "Motivation for NR enhancement for high speed train scenario", 3GPP TSG RAN Meeting #84 RP-191208 Newport Beach, USA, Jun. 3-6, 2019 (Year: 2019).*
(Continued)

*Primary Examiner* — Ayaz R Sheikh
*Assistant Examiner* — David Zhijun Sun
(74) *Attorney, Agent, or Firm* — Syncoda LLC; Feng Ma

(57) ABSTRACT

A signal processing method includes: sending first information to a terminal, the first information including: relation information of a TRS or a CSI-RS with an SRS, and the first information being used to indicate that the terminal adjust a
(Continued)

Transmit first information to a terminal, the first information including information of a TRS or a CSI-RS associated with an SRS, and indicating the terminal to adjust a transmission frequency of the SRS according to a frequency estimated based on TRS or CSI-RS sending frequency of the SRS according to a TRS or CSI-RS estimated frequency.

18 Claims, 9 Drawing Sheets

(51) Int. Cl.
*H04W 72/23* (2023.01)
*H04W 92/20* (2009.01)

(58) Field of Classification Search
CPC . H04W 24/02; H04W 72/1273; H04W 72/23; H04W 88/085; H04W 92/20
See application file for complete search history.

(56) References Cited

U.S. PATENT DOCUMENTS

| | | | |
|---|---|---|---|
| 2019/0109679 A1* | 4/2019 | Liu | H04L 5/005 |
| 2021/0058910 A1 | 2/2021 | Yokomakura et al. | |
| 2021/0377892 A1* | 12/2021 | Chen | H04W 56/001 |
| 2022/0407650 A1* | 12/2022 | Miao | H04L 5/0094 |

FOREIGN PATENT DOCUMENTS

| | | |
|---|---|---|
| CN | 110034853 A | 7/2019 |
| CN | 110178346 A | 8/2019 |
| CN | 110300444 A | 10/2019 |
| WO | 2018132199 A1 | 7/2018 |
| WO | 2019097356 A1 | 5/2019 |
| WO | 2019189751 A1 | 10/2019 |

OTHER PUBLICATIONS

CMCC, "Motivation for NR enhancement for high speed train scenario", 3GPP TSG RAN Meeting #84 RP-191208, Newport Beach, USA, Jun. 3-6, 2019.
International Search Report in the international application No. PCT/CN2020/122103, mailed on Jan. 8, 2021.
English translation of the Written Opinion of the International Search Authority in the international application No. PCT/CN2020/122103, mailed on Jan. 8, 2021.
Spreadtrum Communications, "Discussion on enhancements on HST-SFN deployment", 3GPP TSG RAN WG1 #102-e R1-2006261, e-Meeting, Aug. 17-28, 2020.
Supplementary European Search Report in the European application No. 20887909.8, mailed on Nov. 18, 2022.

* cited by examiner

Transmit first information to a terminal, the first information including information of a TRS or a CSI-RS associated with an SRS, and indicating the terminal to adjust a transmission frequency of the SRS according to a frequency estimated based on TRS or CSI-RS — 201

FIG. 2

Receive first information, the first information including information of a TRS or a CSI-RS associated with an SRS, and configured to instruct the terminal to adjust a transmission frequency of the SRS according to a frequency estimated based on the TRS or the CSI-RS ⟵ 501

FIG. 5

SIGNAL PROCESSING METHOD AND DEVICE

CROSS-REFERENCE TO RELATED APPLICATIONS

This application is a National Stage of International Application No. PCT/CN2020/122103 filed on Oct. 20, 2020, which claims priority to Chinese Patent Application No. 201911112299.9 filed on Nov. 14, 2019. The disclosures of these applications are hereby incorporated by reference in their entirety.

TECHNICAL FIELD

Embodiments of the disclosure relates to the technical field of communication, and in particular to a signal processing method and device.

BACKGROUND

In recent years, high-speed railways have been developed very rapidly, and the high-speed railways around the world have generally reached the speed of 250 km/h, and some of them have even exceeded the speed of 350 km/h. The increase of operating speed of the high-speed railway has a series of effects on mobile communication for the high-speed railway. For example, in a scenario of high-speed movement, a relative speed between a user and a base station is very high, causing a large Doppler frequency offset. When effective measures are not taken to suppress the Doppler effect, performance of a communication system will be seriously affected. Therefore, a terminal needs to estimate Doppler frequency offset of a signal.

Referring to FIG. 1, a Building Base band Unit (BBU) is connected to three Remote Radio Heads (RRHs) by optical fibers, each of the RRHs has two antenna panels in different directions.

Signals transmitted by the RRHs are completely identical, and since the signals reach the terminal (e.g., User Equipment (UE)) through different paths, multiple "multipath" signals with different delays are received at the UE side, and the UE estimates the Doppler frequency based on a Tracking Reference Signal (TRS).

In the figure, two RRHs transmit data in two different directions, Doppler frequencies of the two channels are completely different or even opposite.

Therefore, from the perspective of the UE, the TRS transmitted by the two RRHs is similar to receiving two multipaths with completely different or even opposite Dopplers, and Doppler frequency estimated by the TRS is very inaccurate and cannot reflect actual Doppler frequencies of the two paths.

SUMMARY

Embodiments of the disclosure provide a signal processing method and device, to solve a problem of how to accurately estimate frequencies of signals of different RRHs.

According to a first aspect, an embodiment of the disclosure provides a processing method, applied to a network device, the method includes the following operations.

First information is transmitted to the terminal. The first information includes information of a tracking reference signal (TRS) or a channel state information-reference signal (CSI-RS) associated with a sounding reference signal (SRS), and indicates the terminal to adjust a transmission frequency of the SRS according to frequency information estimated based on the TRS or the CSI-RS.

In an embodiment, the information of the TRS or the CSI-RS associated with the SRS may include at least one of:

a parameter of the SRS comprising a TRS identifier (ID) or a CSI-RS ID; or a transmission configuration indication (TCI) state of the SRS, wherein a quasi-colocation (QCL) in the TCI state is associated with the TRS ID or the CSI-RS ID.

In an embodiment, the parameters of the SRS may be any one of:

a radio resource control (RRC) parameter;

a media access control control element (MAC CE) parameter; or a downlink control information (DCI) parameter.

In an embodiment, the method may further include the following operations.

A TRS or a CSI-RS with which the terminal performs frequency estimation is determined.

In an embodiment, the determining the TRS or the CSI-RS with which the terminal performs frequency estimation may include the following operations.

The TRS or the CSI-RS with which the terminal performs frequency estimation is determined according to downlink channel quality.

Or,

The TRS or the CSI-RS with which the terminal performs frequency estimation is determined according to uplink channel quality.

In an embodiment, the determining the TRS or the CSI-RS with which the terminal performs frequency estimation may include the following operations.

The TRS or the CSI-RS with which the terminal performs frequency estimation is determined according to indication information reported by the terminal and including a TRS ID or a CSI-RS ID, or one or more SRSs corresponding to one or more TRSs or CSI-RSs.

In an embodiment, the method may further include the following operations.

An SRS is received from the terminal.

Frequency information estimated by the network device is determined according to the received SRS.

In an embodiment, the method may further include at least the following operations.

A first frequency which is half of the frequency information estimated by the network device is determined.

The first frequency is transmitted, through an Xn interface, to other network devices around the network device.

Or,

A subsequent physical downlink control channel (PDCCH) or a physical downlink shared channel (PDSCH) or a downlink reference signal is transmitted with the first frequency.

In an embodiment, the method may further include the following operations before receiving the SRS from the terminal.

The TRS or the CSI-RS is transmitted to the terminal with a frequency not subjected to frequency offset adjustment.

According to a second aspect, an embodiment of the disclosure further provides a processing method, applied to a terminal, the method includes the following operations.

First information is received. The first information includes information of a tracking reference signal (TRS) or a channel state information-reference signal (CSI-RS) associated with a sounding reference signal (SRS), and indicates the terminal to adjust a transmission frequency of the SRS according to frequency information estimated based on the TRS or the CSI-RS.

In an embodiment, the information of the TRS or the CSI-RS associated with the SRS may include at least one of:

a parameter of the SRS comprising a TRS identifier (ID) or a CSI-RS ID; or a transmission configuration indication (TCI) state of the SRS, wherein a quasi-colocation (QCL) in the TCI state is associated with the TRS ID or the CSI-RS ID.

In an embodiment, the parameters of the SRS may be any one of:

an RRC parameter;

a MAC CE parameter; or a DCI parameter.

In an embodiment, the method may further include the following operations.

Indication information is reported to a network device. The indication information indicates a TRS or a CSI-RS with which the terminal performs frequency offset estimation, and comprises a TRS identifier (ID) or a CSI-RS ID, or one or more SRSs corresponding to one or more TRSs or CSI-RSs.

According to a third aspect, an embodiment of the disclosure further provides a network device, including a first transmission module.

The first transmission module is configured to transmit first information to a terminal. The first information includes information of a tracking reference signal (TRS) or a channel state information-reference signal (CSI-RS) associated with a sounding reference signal (SRS), and indicates the terminal to adjust a transmission frequency of the SRS according to frequency information estimated based on the TRS or the CSI-RS.

According to a fourth aspect, an embodiment of the disclosure further provides a network device, including a first transceiver and a first processor. The first transceiver is configured to transmit first information to a terminal, the first information includes information of a tracking reference signal (TRS) or a channel state information-reference signal (CSI-RS) associated with a sounding reference signal (SRS), and indicates the terminal to adjust a transmission frequency of the SRS according to frequency information estimated based on the TRS or the CSI-RS.

According to a fifth aspect, an embodiment of the disclosure further provides a terminal, including a first receiving module.

The first receiving module is configured to receive first information. The first information includes information of a tracking reference signal (TRS) or a channel state information-reference signal (CSI-RS) associated with a sounding reference signal (SRS), and indicates the terminal to adjust a transmission frequency of the SRS according to frequency information estimated based on the TRS or the CSI-RS.

According to a sixth aspect, an embodiment of the disclosure further provides a terminal, including a second transceiver and a second processor. The second transceiver is configured to receive first information. The first information includes information of a tracking reference signal (TRS) or a channel state information-reference signal (CSI-RS) associated with a sounding reference signal (SRS), and indicates the terminal to adjust a transmission frequency of the SRS according to frequency information estimated based on the TRS or the CSI-RS.

According to a seventh aspect, an embodiment of the disclosure further provides a communication device including a processor, a memory, and a program stored on the memory and executable by the processor, the program implements operations of the processing method of the first aspect or the second aspect when executed by the processor.

According to an eighth aspect, an embodiment of the disclosure further provides a computer-readable storage medium, having stored thereon a computer program implementing operations of the processing method of the first aspect or the second aspect when executed by the processor.

In the embodiments of the disclosure, the network side may indicate the terminal to adjust the transmission frequency of the SRS according to the frequency estimated based on the TRS or the CSI-RS, so that the terminal may accurately estimate frequencies of signals transmitted by different network devices.

BRIEF DESCRIPTION OF THE DRAWINGS

By reading detailed descriptions of alternative embodiments below, various other advantages and benefits will become apparent to those of ordinary skill in the art. The drawings are intended to illustrate alternative embodiments only and are not intended to limit the disclosure. Furthermore, throughout the drawings, the same component is denoted by the same reference numeral. In the drawings:

FIG. 2 is a first flowchart of a processing method according to an embodiment of the disclosure.

FIG. 5 is a second flowchart of a processing method according to an embodiment of the disclosure.

DETAILED DESCRIPTION

Figure 1:
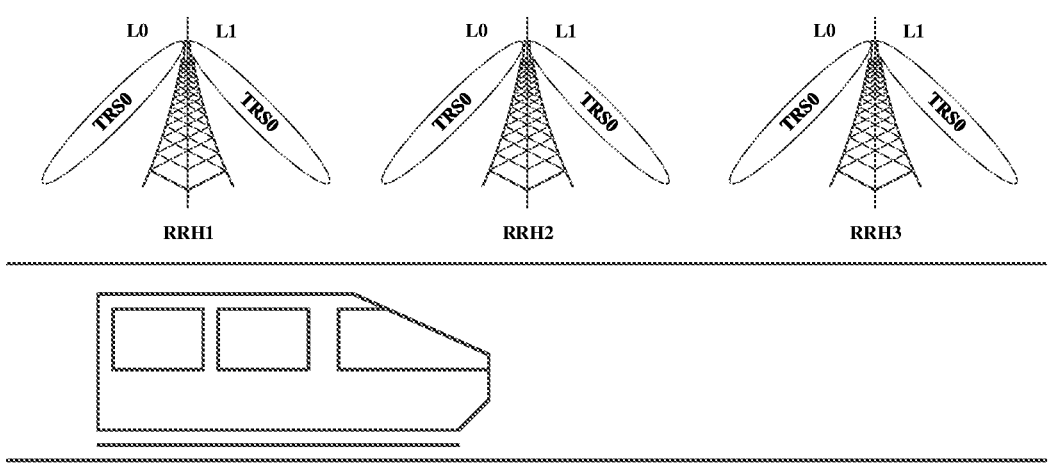
FIG. 1 is a schematic diagram of UE estimating Doppler frequency offset based on a TRS in the related art.

Technical solutions of the embodiments of the disclosure will be clearly and completely described below in conjunction with the drawings in the embodiments of the disclosure. It is apparent that the described embodiments are part of but not all of the embodiments of the disclosure. All other embodiments obtained by those of ordinary skill in the art based on the embodiments of the disclosure without paying any creative work fall within the protection scope of the disclosure.

The term "include" as well as any variations thereof in the description and claims of the disclosure are intended to cover non-exclusive inclusion, for example, a process, method, system, product or device including a series of steps or units are not necessarily limited to those steps or units clearly listed, but may include other steps or units which are not clearly listed or inherent to the process, method, product or device. Furthermore, the description and claims use "and/or" to denote at least one of the connected objects, for example, A and/or B denotes that there are three cases, i.e., including an individual A, an individual B, or both A and B.

In the embodiments of the disclosure, words such as "exemplary", "for example", or the like are intended to be used as an example, examples, or explanations. In the embodiments of the disclosure, any embodiment or design scheme described as "exemplary" or "for example" should not be interpreted as being more preferable or advantageous than other embodiments or design schemes. Specifically, usage of the words such as "exemplary", "for example", or the like is intended to present relevant concepts in a specific way.

Technologies described herein are not limited to fifth-generation (5G) mobile communication systems and subsequent evolutional communication systems, and are not limited to LTE/LTE-Advanced (LTE-A) systems, and may also be used in various wireless communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems.

Terms "system" and "network" are usually used interchangeably. CDMA system may implement radio technologies such as CDMA 2000, Universal Terrestrial Radio Access (UTRA), or the like. UTRA includes Wideband Code Division Multiple Access (WCDMA) and other CDMA variants. TDMA system may implement radio technologies such as Global System for Mobile Communication (GSM) or the like. OFDMA system may implement radio technologies such as Ultra Mobile Broadband (UMB), Evolution-UTRA (E-UTRA), IEEE 802.11 (Wi-Fi), IEEE 802.16 (WiMAX), IEEE 802.20, Flash-OFDM, or the like. UTRA and E-UTRA are part of Universal Mobile Telecommunications System (UMTS). LTE and more advanced LTE (such as LTE-A) are new UMTS releases using E-UTRA. UTRA, E-UTRA, UMTS, LTE, LTE-A, and GSM are described in documents from an organization named as "3rd Generation Partnership Project (3GPP)". CDMA 2000 and UMB are described in documents from an organization named as "3rd Generation Partnership Project 2 (3GPP2)". The technologies described herein may be used in the above-mentioned systems and radio technologies as well as other systems and radio technologies.

Referring to FIG. 2, an embodiment of the disclosure provides a processing method, the method is executed by a network device and includes a specific operation, i.e., operation 201.

In operation 201, first information is transmitted to the terminal. The first information includes information of a tracking reference signal (TRS) or a channel state information-reference signal (CSI-RS) associated with a sounding reference signal (SRS), and indicates a terminal to adjust a transmission frequency of the SRS according to a frequency estimated based on the TRS or the CSI-RS.

In some implementations, the information of the TRS or the CSI-RS associated with the SRS may include at least one of:

(1) a parameter(s) of the SRS including TRS ID or CSI-RS ID; or (2) a transmission configuration indication (TCI) state of the SRS, a quasi-colocation (QCL) in the TCI state being associated with the TRS ID or the CSI-RS ID.

In some implementations, the parameters of the SRS may be any one of:

(1) a RRC parameter;

(2) a MAC CE parameter; or (3) a DCI parameter.

In some implementations, based on the method shown in FIG. 2, the method may further include the following operations before or after the operation 201. A TRS or a CSI-RS with which the terminal performs frequency estimation is determined.

In an embodiment, the TRS or the CSI-RS with which the terminal performs frequency estimation may be determined in the following manners.

First manner the TRS or the CSI-RS with which the terminal performs frequency estimation is determined according to downlink channel quality.

Exemplarily, a base station may determine channel quality of a RRH antenna panel according to feedback of the downlink channel quality, such as a Channel Quality Indicator (CQI) or the like, to further determine the frequency estimation to be performed by using the TRS or the CSI-RS transmitted by the RRH antenna panel.

Second manner the TRS or the CSI-RS with which the terminal performs frequency estimation is determined according to uplink channel quality.

Exemplarily, channel quality of a RRH antenna panel may be determined by measuring the uplink channel quality, for example, by measuring uplink SRS, to further determine the frequency estimation to be performed by using the TRS or the CSI-RS transmitted by the RRH antenna panel.

Third manner the TRS or the CSI-RS with which the terminal performs frequency estimation is determined according to indication information reported by the terminal.

The indication information may include TRS ID or CSI-RS ID. Exemplarily, UE explicitly reports a certain TRS ID or CSI-RS ID, for example, reports TRS1 or CSI-RS1, and notifies the base station that frequency estimation is performed by using the TRS1 or the CSI-RS1.

The indication information may include one or more SRSs corresponding to one or more TRSs or CSI-RSs. Exemplarily, the base station configures multiple SRSs for UE, and each of the SRSs is associated with a respective TRS or CSI-RS, for example, SRS1 is associated with TRS1 or CSI-RS1, SRS2 is associated with TRS2 or CSI-RS2. When the TRS1 or the CSI-RS1 is found to be better after measuring the TRS or the CSI-RS, UE transmits the SRS1 to the base station, so that the base station knows that UE performs frequency estimation by using the TRS1 or the CSI-RS1.

In an embodiment, the method may further include the following operations. An SRS is received from the terminal. Frequency estimated by the network device is determined according to the received SRS.

In an embodiment, the method may further include the following operations. A first frequency which is half of the frequency estimated by the network device is determined. The first frequency is transmitted, through an Xn interface, to other network devices around the network device.

In an embodiment, the method may further include the following operations. A first frequency which is half of the frequency estimated by the network device is determined. A subsequent PDCCH or PDSCH or downlink reference signal is transmitted with the first frequency.

In an embodiment, the method may further include the following operations before receiving the SRS from the terminal. The TRS or the CSI-RS is transmitted to the terminal with a frequency not subjected to frequency offset adjustment.

In the embodiment of the disclosure, each network device and different antenna panels of the network device transmit different TRSs or CSI-RSs. The TRS or the CSI-RS is transmitted at the frequency without frequency correction.

Figure 3:
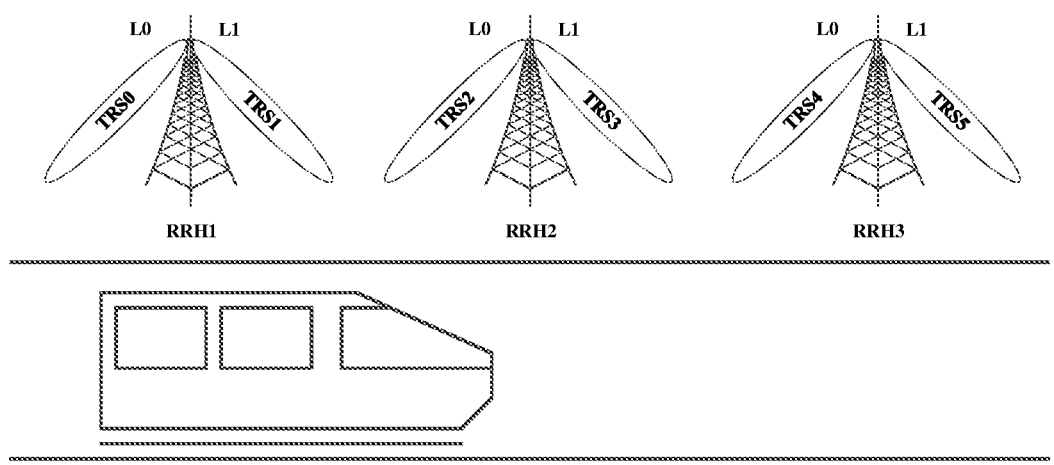
FIG. 3 is a schematic diagram of RRH1, RRH2 and RRH3 transmitting different TRSs according to an embodiment of the disclosure.

Referring to FIG. 3, each RRH and different antenna panels of the RRH transmit different TRSs, i.e., the IDs of the TRSs are different. RRH1 transmits TRS0 and TRS1, RRH2 transmits TRS2 and TRS3, and RRH3 transmits TRS4 and TRS5, here TRS0, TRS1, TRS2, TRS3, TRS4 and TRS5 are transmitted at frequencies without frequency correction.

Furthermore, RRH1, RRH2 and RRH3 may exchange their estimated frequencies with interfaces (e.g., Xn interfaces) there-between, e.g., RRH1 informs RRH2 of a frequency $\Delta f1$.

In the embodiment of the disclosure, the network device divides the frequency estimated based on the SRS by 2, to be used for subsequent transmission of the PDCCH or the PDSCH.

Figure 4:
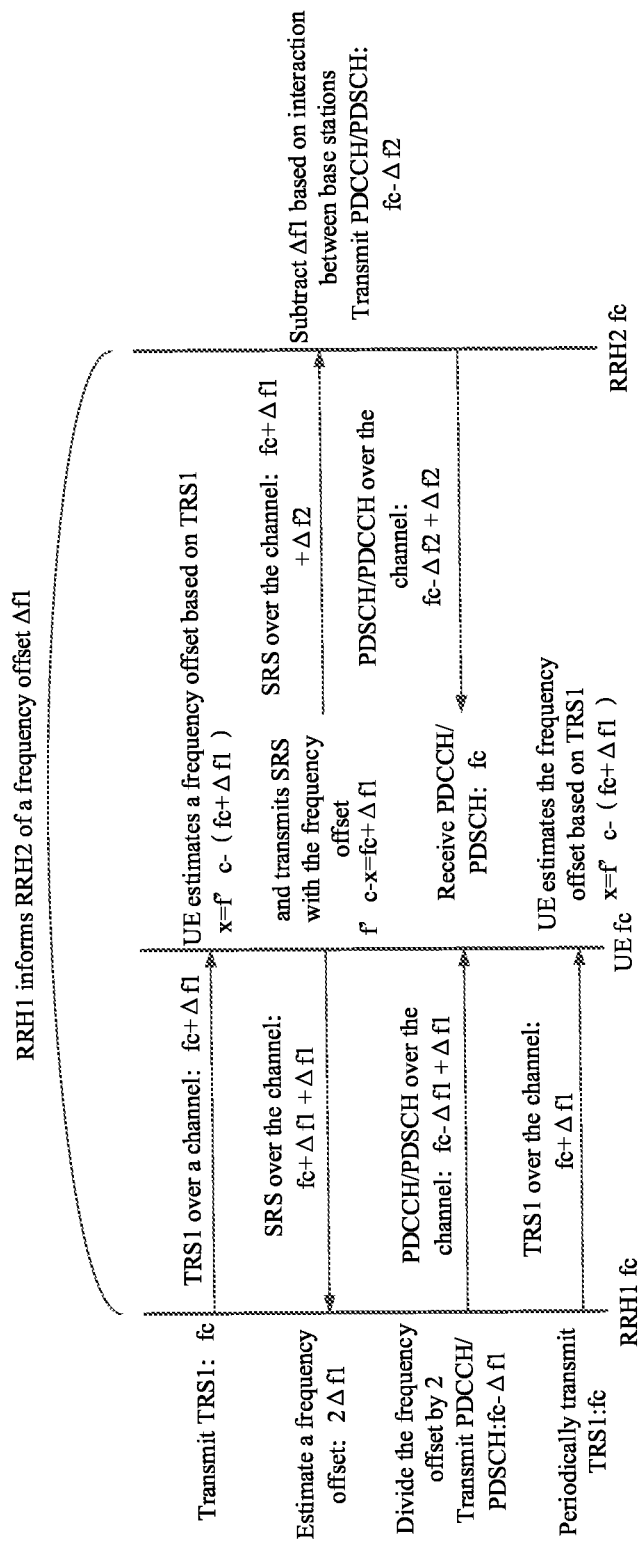
FIG. 4 is a schematic diagram of RRH1, RRH2, RRH3 and UE performing frequency estimation according to an embodiment of the disclosure.

Referring to FIG. 4, RRH1 informs RRH2 of the frequency $\Delta f1$, RRH1 transmits TRS1 at fc (a center frequency), UE estimates a frequency x is equal to $fc-(fc+\Delta f1)$ based on TRS1 and transmits an SRS to RRH1 and RRH2 respectively with the frequency, the frequency estimated by RRH1 is $2\Delta f1$, RRH1 divides the estimated frequency $2\Delta f1$ by 2 and transmits signals carried on PDCCH/PDSCH at a frequency $fc-\Delta f1$.

With continued reference to FIG. 4, RRH2 subtracts $\Delta f1$ based on interaction between base stations, RRH2 transmits signals carried on PDCCH/PDSCH to UE at a frequency $fc-\Delta f2$, and UE receive the signals carried on PDCCH/PDSCH at the frequency fc.

In the embodiment of the disclosure, the network side may indicate the terminal to adjust the transmission frequency of the SRS according to the frequency estimated based on the TRS or the CSI-RS, so that the terminal may accurately estimate frequencies of signals transmitted by different network devices.

Referring to FIG. 5, an embodiment of the disclosure further provides a processing method, the method is executed by a terminal and includes a specific operation, i.e., operation 501.

In operation 501, first information is received. The first information includes information of a tracking reference signal (TRS) or a channel state information-reference signal (CSI-RS) associated with a sounding reference signal (SRS), and indicates the terminal to adjust a transmission frequency of the SRS according to frequency information estimated based on the TRS or the CSI-RS.

In some implementations, the information of the TRS or the CSI-RS associated with the SRS may include at least one of:

(1) a parameter of the SRS including TRS ID or CSI-RS ID; or (2) a TCI state of the SRS having a QCL associated with the TRS ID or the CSI-RS ID.

In some implementations, the parameters of the SRS may be any one of:

(1) a RRC parameter;

(2) a MAC CE parameter; or (3) a DCI parameter.

In some implementations, based on the method shown in FIG. 5, the method may further include the following operations before or after the operation 501.

Indication information is reported to a network device. The indication information indicates a TRS or a CSI-RS with which the terminal performs frequency estimation.

The indication information may include a TRS ID or a CSI-RS ID. Exemplarily, UE explicitly reports a certain TRS ID or CSI-RS ID, for example, TRS1 or CSI-RS1, and notifies the base station that frequency estimation is performed by using the TRS1 or the CSI-RS1.

The indication information may include one or more SRSs corresponding to one or more TRSs or CSI-RSs. Exemplarily, the base station configures multiple SRSs for the UE, and each of the SRSs is associated with a TRS or a CSI-RS, for example, SRS1 is associated with TRS1 or CSI-RS1, SRS2 is associated with TRS2 or CSI-RS2. When the TRS1 or the CSI-RS1 is found to be better after measuring the TRS or the CSI-RS, the UE transmits the SRS1 to the base station, so that the base station knows that UE performs frequency estimation by using the TRS1 or the CSI-RS1.

In the embodiment of the disclosure, the network side may indicate the terminal to adjust the transmission frequency of the SRS according to the frequency estimated based on the TRS or the CSI-RS, so that the terminal may accurately estimate frequencies of signals transmitted by different network devices.

Figure 6:
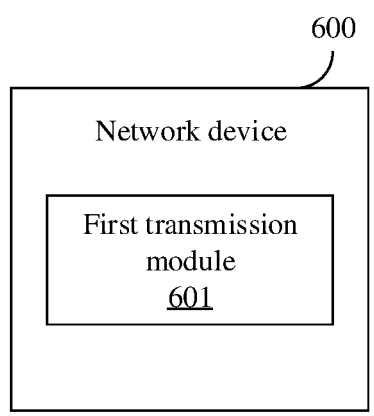
FIG. 6 is a first schematic diagram of a network device according to an embodiment of the disclosure.

Referring to FIG. 6, an embodiment of the disclosure further provides a network device 600, including a first transmission module 601.

The first transmission module 601 is configured to transmit first information to a terminal. The first information includes information of a TRS or a CSI-RS associated with an SRS, and indicates the terminal to adjust a transmission frequency of the SRS according to a frequency estimated based on the TRS or the CSI-RS.

In some implementations, the information of the TRS or the CSI-RS associated with the SRS may include at least one of:

(1) a parameter of the SRS including TRS ID or CSI-RS ID; or (2) a TCI state of the SRS having a QCL associated with the TRS ID or the CSI-RS ID.

In some implementations, the parameters of the SRS may be any one of:

(1) a RRC parameter;

(2) a MAC CE parameter; or (3) a DCI parameter.

In some implementations, based on those shown in FIG. 6, the network device 600 may further include a first determination module. The first determination module is configured to determine a TRS or a CSI-RS with which the terminal performs frequency estimation.

In an embodiment, the TRS or the CSI-RS with which the terminal performs frequency estimation may be determined in the following manners.

First manner the TRS or the CSI-RS with which the terminal performs frequency estimation is determined according to downlink channel quality.

Exemplarily, a base station may determine channel quality of a RRH antenna panel according to feedback of the downlink channel quality, such as a CQI or the like, to further determine the frequency estimation to be performed by using the TRS or the CSI-RS transmitted by the RRH antenna panel.

Second manner the TRS or the CSI-RS with which the terminal performs frequency estimation is determined according to uplink channel quality.

Exemplarily, channel quality of a RRH antenna panel may be determined by measuring the uplink channel quality, for example, by measuring uplink SRS, to further determine the frequency estimation to be performed by using the TRS or the CSI-RS transmitted by the RRH antenna panel.

Third manner the TRS or the CSI-RS with which the terminal performs frequency estimation is determined according to indication information reported by the terminal.

The indication information may include a TRS ID or a CSI-RS ID. Exemplarily, UE explicitly reports a certain TRS ID or CSI-RS ID, for example, TRS1 or CSI-RS1, and notifies the base station that frequency estimation is performed by using the TRS1 or the CSI-RS1.

The indication information may include one or more SRSs corresponding to one or more TRSs or CSI-RSs. Exemplarily, the base station configures multiple SRSs for UE, and each of the SRSs is associated with a respective TRS or CSI-RS, for example, SRS1 is associated with TRS1 or CSI-RS1, SRS2 is associated with TRS2 or CSI-RS2. When the TRS1 or the CSI-RS1 is found to be better after measuring the TRS or the CSI-RS, UE transmits the SRS1 to the base station, so that the base station knows that UE performs frequency estimation by using the TRS1 or the CSI-RS1.

In some implementations, based on those shown in FIG. 6, the network device 600 may further include a second receiving module and a second determination module.

The second receiving module is configured to receive an SRS from the terminal.

The second determination module is configured to determine, according to the received SRS, a frequency estimated by the network device.

In some implementations, based on those shown in FIG. 6, the network device 600 may further include a third determination module and a second transmission module.

The third determination module is configured to determine a first frequency which is half of the frequency estimated by the network device.

The second transmission module is configured to transmit, through an Xn interface, the first frequency to other network devices around the network device.

In some implementations, based on those shown in FIG. 6, the network device 600 may further include a fourth determination module and a transmitting module.

The fourth determination module is configured to determine a first frequency which is half of the frequency estimated by the network device.

The transmitting module is configured to transmit, by using the first frequency, a subsequent PDCCH or PDSCH or downlink reference signal.

In some implementations, based on those shown in FIG. 6, the network device 600 may further include a third transmission module.

The third transmission module is configured to transmit the TRS or the CSI-RS to the terminal with a frequency not subjected to frequency offset adjustment, before receiving the SRS from the terminal.

The network device provided in the embodiment of the disclosure may execute the above method embodiment of FIG. 2, the implementation principles and technical effects are similar, and are not elaborated here in the embodiment.

Figure 7:
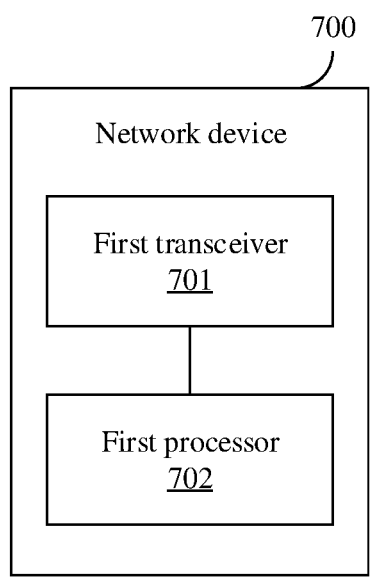
FIG. 7 is a second schematic diagram of a network device according to an embodiment of the disclosure.

Referring to FIG. 7, an embodiment of the disclosure further provides a network device 700, including a first transceiver 701 and a first processor 702. The first transceiver 701 is configured to transmit first information to a terminal. The first information includes information of a TRS or a CSI-RS associated with an SRS, and indicates the terminal to adjust a transmission frequency of the SRS according to a frequency estimated based on the TRS or the CSI-RS.

In some implementations, the information of the TRS or the CSI-RS associated with the SRS may include at least one of:

(1) a parameter of the SRS including TRS ID or CSI-RS ID; or (2) a TCI state of the SRS having a QCL associated with the TRS ID or the CSI-RS ID.

In some implementations, the parameter of the SRS may be any one of:

(1) a RRC parameter;
(2) a MAC CE parameter; or
(3) a DCI parameter.

In some implementations, the first processor 702 is configured to determine a TRS or a CSI-RS with which the terminal performs frequency estimation.

In an embodiment, the TRS or the CSI-RS with which the terminal performs frequency estimation may be determined in the following manners.

First manner the TRS or the CSI-RS with which the terminal performs frequency estimation is determined according to downlink channel quality.

Exemplarily, a base station may determine channel quality of a RRH antenna panel according to feedback of the downlink channel quality, such as a CQI or the like, to further determine the frequency estimation to be performed by using the TRS or the CSI-RS transmitted by the RRH antenna panel.

Second manner the TRS or the CSI-RS with which the terminal performs frequency estimation is determined according to uplink channel quality.

Exemplarily, channel quality of a RRH antenna panel may be determined by measuring the uplink channel quality, for example, by measuring uplink SRS, to further determine the frequency estimation to be performed by using the TRS or the CSI-RS transmitted by the RRH antenna panel.

Third manner the TRS or the CSI-RS with which the terminal performs frequency estimation is determined according to indication information reported by the terminal.

Explicit indication information may include TRS ID or CSI-RS ID. Exemplarily, UE explicitly reports a certain TRS ID or CSI-RS ID, for example, TRS1 or CSI-RS1, and notifies the base station that frequency estimation is performed by using the TRS1 or the CSI-RS1.

Implicit indication information may include one or more SRSs corresponding to one or more TRSs or CSI-RSs. Exemplarily, the base station configures multiple SRSs for UE, and each of the SRSs is associated with a respective TRS or CSI-RS, for example, SRS1 is associated with TRS1 or CSI-RS1, SRS2 is associated with TRS2 or CSI-RS2. When the TRS1 or the CSI-RS1 is found to be better after measuring the TRS or the CSI-RS, the UE transmits the SRS1 to the base station, so that the base station knows that UE performs frequency estimation by using the TRS1 or the CSI-RS1.

In some implementations, the first transceiver 701 may be further configured to receive an SRS from the terminal.

The first processor 702 may be further configured to determine, according to the received SRS, a frequency estimated by the network device.

In some implementations, the first processor 702 may be further configured to determine a first frequency which is half of the frequency estimated by the network device.

The first transceiver 701 may be further configured to transmit, through an Xn interface, the first frequency to other network devices around the network device.

In some implementations, the first processor 702 may be further configured to determine a first frequency which is half of the frequency estimated by the network device.

The first processor 702 may be further configured to transmit, by using the first frequency, a subsequent PDCCH or PDSCH or downlink reference signal.

In some implementations, the first processor 702 may be further configured to transmit the TRS or the CSI-RS to the terminal with a frequency not subjected to frequency offset adjustment, before receiving the SRS from the terminal.

The network device provided in the embodiment of the disclosure may execute the above method embodiment of FIG. 2, the implementation principles and technical effects are similar, and are not elaborated here in the embodiment.

Figure 8:
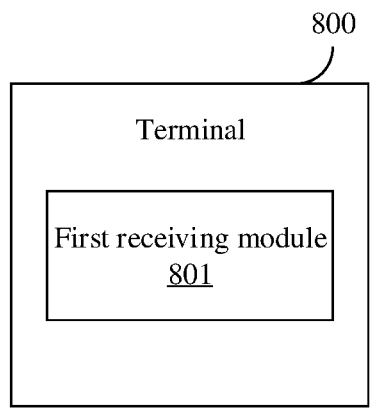
FIG. 8 is a second schematic diagram of a terminal according to an embodiment of the disclosure.

Referring to FIG. 8, an embodiment of the disclosure further provides a terminal 800, including a first receiving module 801.

The first receiving module 801 is configured to receive first information. The first information includes information of a TRS or a CSI-RS associated with an SRS, and indicates the terminal to adjust a transmission frequency of the SRS according to a frequency estimated based on the TRS or the CSI-RS.

In some implementations, the information of the TRS or the CSI-RS associated with the SRS may include at least one of:

(1) a parameter of the SRS including TRS ID or CSI-RS ID; or (2) a TCI state of the SRS having a QCL associated with the TRS ID or the CSI-RS ID.

In some implementations, the parameters of the SRS may be any one of:

(1) a RRC parameter;

(2) a MAC CE parameter; or (3) a DCI parameter.

In some implementations, based on the method shown in FIG. 8, the terminal 800 may further include a fourth transmission module.

The fourth transmission module is configured to report, to a network device, indication information indicating a TRS or a CSI-RS with which the terminal performs frequency estimation.

Explicit indication information may include TRS ID or CSI-RS ID. Exemplarily, UE explicitly reports a certain TRS ID, for example, TRS1, and notifies the base station that frequency estimation is performed by using the TRS1.

Implicit indication information may include one or more SRSs corresponding to one or more TRSs or CSI-RSs. Exemplarily, the base station configures multiple SRSs for UE, and each of the SRSs is associated with a respective TRS, for example, SRS1 is associated with TRS1, SRS2 is associated with TRS2. When the TRS1 is found to be better after measuring the TRS, UE transmits the SRS1 to the base station, so that the base station knows that UE performs frequency estimation by using the TRS1.

The terminal provided in the embodiment of the disclosure may execute the above method embodiment of FIG. 5, the implementation principles and technical effects are similar, and are not elaborated here in the embodiment.

Figure 9:
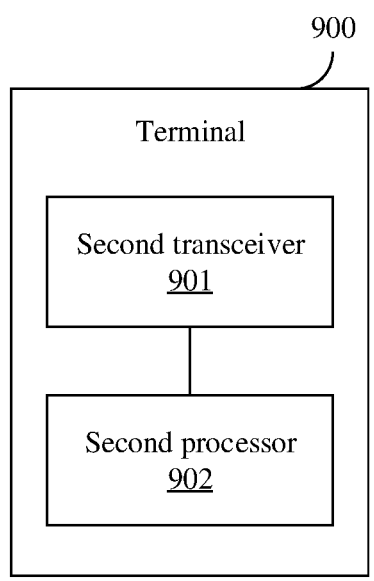
FIG. 9 is a second schematic diagram of a terminal according to an embodiment of the disclosure.

Referring to FIG. 9, an embodiment of the disclosure further provides a terminal 900, including a second transceiver 901 and a second processor 902. The second transceiver 901 is configured to receive first information. The first information includes information of a TRS or a CSI-RS associated with an SRS, and indicates the terminal to adjust a transmission frequency of the SRS according to a frequency estimated based on the TRS or the CSI-RS.

In some implementations, the information of the TRS or the CSI-RS associated with the SRS may include at least one of:

(1) a parameter of the SRS including TRS ID or CSI-RS ID; or (2) a TCI state of the SRS having a QCL associated with the TRS ID or the CSI-RS ID.

In some implementations, the parameter of the SRS may be any one of:

(1) a RRC parameter;

(2) a MAC CE parameter; or (3) a DCI parameter.

In some implementations, the second transceiver 901 may be further configured to report, to a network device, indication information indicating a TRS or a CSI-RS with which the terminal performs frequency estimation.

Explicit indication information may include TRS ID or CSI-RS ID. Exemplarily, UE explicitly reports a certain TRS ID, for example, TRS1, and notifies the base station that frequency estimation is performed by using the TRS1.

Implicit indication information may include one or more SRSs corresponding to one or more TRSs or CSI-RSs. Exemplarily, the base station configures multiple SRSs for the UE, and each of the SRSs is associated with a respective TRS, for example, SRS1 is associated with TRS1, SRS2 is associated with TRS2. When the TRS1 is found to be better after measuring the TRS, the UE transmits the SRS1 to the base station, so that the base station knows that UE performs frequency estimation by using the TRS1.

The terminal provided in the embodiment of the disclosure may execute the above method embodiment of FIG. 5, the implementation principles and technical effects are similar, and are not elaborated here in the embodiment.

Figure 10:
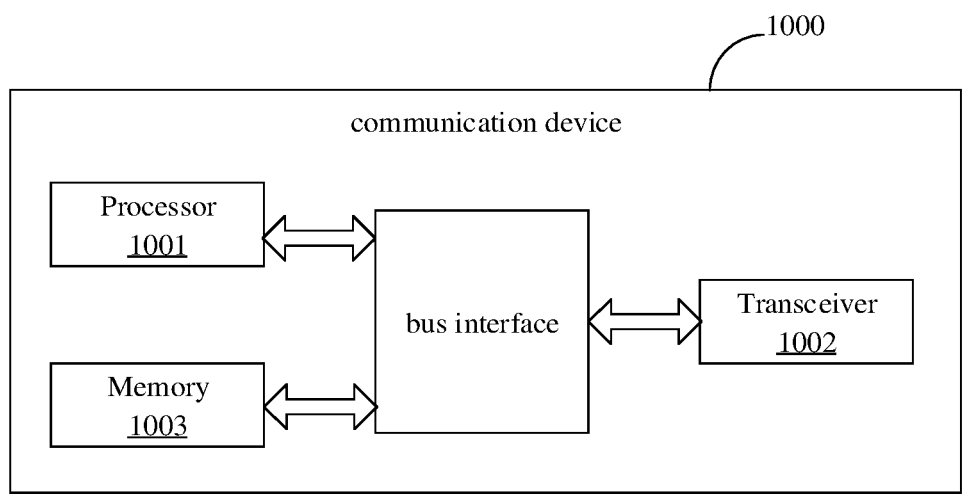
FIG. 10 is a schematic diagram of a communication device according to an embodiment of the disclosure.

Referring to FIG. 10, it is a structural diagram of a communication device applied to an embodiment of the disclosure. As shown in FIG. 10, the communication device 1000 includes a processor 1001, a transceiver 1002, a memory 1003, and a bus interface. The processor 1001 may be responsible for managing a bus architecture and general processing. The memory 1003 may store data used by the processor 1001 upon performing operations.

In an embodiment of the disclosure, the communication device 1000 further includes a computer program stored on the memory 1003 and executable by the processor 1001, the computer program implements operations of the above method of FIG. 2 or FIG. 5 when executed by the processor 1001.

In FIG. 10, the bus architecture may include any number of interconnected buses and bridges, specifically, connected together by various circuits including one or more processors represented by the processor 1001 and memories represented by the memory 1003. The bus architecture may also connect various other circuits, such as a peripheral device, a voltage regulator, a power management circuit, or the like together, which is well known in the art and thus is not described further here. The bus interface provides an interface. The transceiver 1002 may include multiple elements, that is, include a transmitter and a receiver, to provide units for communicating with various other devices on a transmission medium.

The communication device provided in the embodiment of the disclosure may execute the above method embodiment of FIG. 2 or FIG. 5, their implementation principles and technical effects are similar, and are not elaborated here in the embodiment.

Operations of the method or algorithm described in conjunction with contents disclosed by the disclosure may be implemented in form of hardware or in form of a processor executing software instructions. The software instructions may be consisted of corresponding software modules which may be stored in a Random Access Memory (RAM), a flash memory, a Read Only Memory (ROM), an Electrically Programmable Read Only Memory (EPROM), an Electrically Erasable Programmable Read Only Memory (EEPROM), a register, a hard disk, a mobile hard disk, a Compact Disk ROM (CD-ROM), or any other forms of storage mediums known in the art. An exemplary storage medium is coupled to the processor, enabling the processor to read information from the storage medium and write information to the storage medium. Of course, the storage medium may also be part of the processor. The processor and the storage medium may be carried in an Application Specific Integrated Circuit (ASIC). Furthermore, the ASIC may be carried in a core network interface device. Of course, the processor and the storage media may also exist as discrete components in the core network interface device.

It may be appreciated by those skilled in the art that in at least one of the above examples, the functions described in the disclosure may be implemented in hardware, software, firmware, or any combination thereof. When implemented in software, these functions may be stored in a computer-readable medium or transmitted as one or more instructions or codes on the computer-readable medium. The computer-readable medium includes a computer storage medium and a communication medium, and the communication medium includes any medium facilitating transmission of a computer program from one place to another. The storage medium may be any available medium accessible to a general purpose or special purpose computer.

The objects, technical solutions and advantageous effects of the disclosure are further described in detail in the above specific embodiments. It may be understood that the above descriptions are merely specific embodiments of the disclosure, and are not intended to limit the protection scope of the disclosure. Any modification, equivalent replacement, improvement, or the like made based on the technical solutions of the disclosure should be included in the protection scope of the disclosure It may be appreciated by those skilled in the art that the embodiments of the disclosure may be provided as a method, a system, or a computer program product. Therefore, the embodiments of the disclosure may take a form of an entire hardware embodiment, an entire software embodiment, or an embodiment combining software with hardware. Furthermore, the embodiments of the disclosure may take a form of a computer program product implemented on one or more computer-usable storage mediums containing computer-usable program codes (including, but not limited to, a magnetic disk memory, CD-ROM, an optical memory, or the like).

The units described as separate components may be or may not be physically separate, and the components shown as units may be or may not be physical units, i.e. they may be located in a place, or may be distributed over multiple network units. Part or all of the units may be selected according to actual needs to achieve the purpose of the solution of the embodiment.

Furthermore, the functional units in the embodiments of the disclosure may be integrated in a processing unit, or each of the unit may physically exist alone, or two or more of the units may be integrated in a unit.

When implemented in form of a software function module and sold or used as an independent product, the functions may be stored in a computer-readable storage medium. Based on such understanding, the technical solutions of the disclosure substantially or parts making contributions to the related art may be embodied in form of a software product, and the computer software product is stored in a storage medium, including multiple instructions for enabling a computer device (which may be a personal computer, a server, a network device, or the like) to execute all or part of operations of the methods in the embodiments of the disclosure. The above-mentioned storage medium includes various mediums capable of storing program codes such as a U disk, a mobile hard disk, a ROM, a RAM, a magnetic disk, an optical disk or the like.

It may be understood by those of ordinary skill in the art that all or part of the processes of the above method embodiments may be implemented by controlling related hardware through a computer program, the program may be stored in a computer-readable storage medium, and the program may include the processes of the above method embodiments when it is executed. The storage medium may be a magnetic disk, an optical disk, a ROM, a RAM, or the like.

It may be understood that these embodiments described in the embodiments of the disclosure may be implemented in hardware, software, firmware, middleware, microcode, or a combination thereof. For hardware implementation, modules, units and subunits may be implemented in one or more ASICs, Digital Signal Processors (DSPs), DSP Devices (DSPDs), Programmable Logic Devices (PLDs), Field-Programmable Gate Arrays (FPGA), general purpose processors, controllers, microcontrollers, microprocessors, other electronic units for performing the functions described in the disclosure, or a combinations thereof.

For software implementation, the technologies described in the embodiments of the disclosure may be implemented by modules (e.g., processes, functions, etc.) performing the functions described in the embodiments of the disclosure. The software codes may be stored in a memory and executed by a processor. The memory may be implemented in or out of the processor.

The embodiments of the disclosure are described with reference to flowcharts and/or block diagrams of the methods, devices (systems) and computer program products according to the embodiments of the disclosure. It may be understood that each process and/or block of the flowcharts and/or block diagrams, and a combination of processes and/or blocks of the flowcharts and/or block diagrams may be implemented by computer program instructions. The computer program instructions may be provided to a processor of a general purpose computer, a dedicated computer, an embedded processor, or another programmable data processing device to generate a machine, such that the instructions executed by the processor of the computer or another programmable data processing device generate an apparatus implementing the functions specified in one or more processes of the flowcharts and/or in one or more blocks of the block diagrams.

The computer program instructions may also be stored in a computer-readable memory capable of directing a computer or another programmable data processing device to operate in a particular way, such that the instructions stored in the computer-readable memory produce an article of manufacture including instruction means that implement the functions specified in one or more processes of the flowcharts and/or in one or more blocks of the block diagrams.

The computer program instructions may also be loaded onto a computer or another programmable data processing device, such that a series of operational steps are executed on the computer or another programmable device to produce computer-implemented processing, so that the instructions executed on the computer or another programmable device provide operations implementing the functions specified in one or more processes of the flowcharts and/or in one or more blocks of the block diagrams.

It is apparent that various modifications and variations may be made by those skilled in the art to the embodiments of the disclosure, without departing from the spirit and scope of the disclosure. Therefore, should these modifications and variations of the embodiments of the disclosure fall within the scope of the claims of the disclosure and their equivalent technologies, the disclosure is also intended to encompass these modifications and variations.

What is claimed is:

1. A signal processing method, applied to a network device, the method comprising:
    determining, by the network device, a plurality of Tracking Reference Signals (TRSs) or Channel State Information-Reference Signals (CSI-RSs) with which a terminal performs frequency estimation;
    transmitting, by the network device, each of the plurality of TRSs or CSI-RSs to the terminal through a respective one of a plurality of antenna panels of the network device;
    transmitting, to the terminal, first information,
    wherein the first information comprises information of association of the plurality of TRSs or CSI-RSs with a plurality of sounding reference signals (SRSs), wherein each of the plurality of SRSs is associated with a respective one of the plurality of TRSs or CSI-RS, and the first information indicates the terminal to adjust a transmission frequency of each of the plurality of SRSs according to frequency information estimated by the terminal based on a respective one of the plurality of TRSs or CSI-RSs,
    wherein the frequency information comprises Doppler frequency offset.

2. The method of claim 1, wherein the information of the plurality of TRSs or CSI-RSs associated with the plurality of SRSs comprises at least one of:
    parameters of the plurality of SRSs comprising TRS identifiers (IDs) or CSI-RS IDs; or
    transmission configuration indication (TCI) states of the plurality of SRSs, wherein quasi-colocations (QCLs) in the TCI states are associated with the TRS IDs or the CSI-RS IDs.

3. The method of claim 2, wherein each of the parameters of the plurality of SRSs is any one of:
    a radio resource control (RRC) parameter;
    a media access control control element (MAC CE) parameter; or
    a downlink control information (DCI) parameter.

4. The method of claim 1, wherein the determining, by the network device, the plurality of TRSs or CSI-RSs with which the terminal performs the frequency estimation comprises:
    determining, according to downlink channel quality, the plurality of TRSs or CSI-RSs with which the terminal performs the frequency estimation; or
    determining, according to uplink channel quality, the plurality of TRSs or CSI-RSs with which the terminal performs the frequency estimation.

5. The method of claim 1, wherein the determining, by the network device, the plurality of TRSs or the CSI-RSs with which the terminal performs the frequency estimation comprises:
    determining, according to indication information reported by the terminal, the plurality of TRSs or the CSI-RSs with which the terminal performs the frequency estimation, the indication information comprising a TRS identifier (ID) or a CSI-RS ID, or one or more SRSs corresponding to one or more TRSs or CSI-RSs.

6. The method of claim 1, further comprising:
    receiving an SRS from the terminal; and
    determining, according to the received SRS, frequency information estimated by the network device.

7. The method of claim 6, further comprising at least one of:
    determining a first frequency which is half of the frequency information estimated by the network device, and transmitting, through an Xn interface, the first frequency to other network devices around the network device; or
    transmitting a subsequent physical downlink control channel (PDCCH) or a physical downlink shared channel (PDSCH) or a downlink reference signal with the first frequency.

8. The method of claim 6, wherein before receiving the SRS from the terminal, the method further comprises:
    transmitting the plurality of TRSs or CSI-RSs to the terminal with a frequency not subjected to frequency offset adjustment.

9. A non-transitory computer-readable storage medium, having stored thereon a computer program, wherein the computer program, when executed by the processor, implements steps of the signal processing method of claim 1.

10. A signal processing method, applied to a terminal, the method comprising:
    receiving, from a network device, a plurality of Tracking Reference Signals (TRSs) or Channel State Information-Reference Signals (CSI-RSs), wherein each of the plurality of TRSs or CSI-RSs is transmitted through a respective one of a plurality of antenna panels of the network device;
    receiving first information, wherein the first information comprises information of association of the plurality of TRSs or CSI-RSs with a plurality of sounding reference signals (SRSs), wherein each of the plurality of SRSs is associated with a respective one of the plurality of TRSs or CSI-RS, and the first information indicates the terminal to adjust a transmission frequency of each of the plurality of SRSs according to frequency information estimated by the terminal based on a respective one of the plurality of TRSs or CSI-RSs,
    wherein the frequency information comprises Doppler frequency offset.

11. The method of claim 10, wherein the information of the plurality of TRSs or CSI-RSs associated with the plurality of SRSs comprises at least one of:
    parameters of the plurality of SRSs comprising TRS identifiers (IDs) or CSI-RS IDs; or
    transmission configuration indication (TCI) states of the plurality of SRSs, wherein quasi-colocation (QCLs) in the TCI states is associated with the TRS IDs or the CSI-RS IDs.

12. The method of claim 10, wherein each of parameters of the plurality of SRSs is any one of:
- a radio resource control (RRC) parameter;
- a media access control control element (MAC CE) parameter; or a downlink control information (DCI) parameter.

13. The method of claim 10, further comprising:
reporting indication information to the network device, wherein the indication information indicates a TRS or a CSI-RS with which the terminal performs frequency offset estimation, and comprises a TRS identifier (ID) or a CSI-RS ID, or one or more SRSs corresponding to one or more TRSs or CSI-RSs.

14. A terminal, comprising:
a second processor; and
a second transceiver, configured to implement steps of the signal processing method of claim 10.

15. A network device, comprising:
a first processor; and
a first transceiver,
wherein the first processor is configured to determine a plurality of Tracking Reference Signals (TRSs) or Channel State Information-Reference Signals (CSI-RSs) with which a terminal performs frequency estimation,
wherein the first transceiver is configured to:
transmit each of the plurality of TRSs or CSI-RSs to the terminal through a respective one of a plurality of antenna panels of the network device; and
transmit first information to the terminal, wherein the first information comprises information of association of the plurality of TRSs or CSI-RSs with a plurality of sounding reference signals (SRSs), wherein each of the plurality of SRSs is associated with a respective one of the plurality of TRSs or CSI-RS, and the first information indicates the terminal to adjust a transmission frequency of each of the plurality of SRSs according to frequency information estimated by the terminal based on a respective one of the plurality of TRSs or CSI-RS,
wherein the frequency information comprises Doppler frequency offset.

16. The network device of claim 15, wherein the information of the plurality of TRSs or CSI-RSs associated with the plurality of SRSs comprises at least one of:
- parameters of the plurality of SRSs comprising TRS identifiers (IDs) or CSI-RS IDs; or
- transmission configuration indication (TCI) states of the plurality of SRSs, wherein quasi-colocations (QCLs) in the TCI states are associated with the TRS IDs or the CSI-RS IDs.

17. The network device of claim 16, wherein each of the parameters of the plurality of SRSs is any one of:
- a radio resource control (RRC) parameter;
- a media access control control element (MAC CE) parameter; or a downlink control information (DCI) parameter.

18. The network device of claim 15, wherein in order to determine the plurality of TRSs or CSI-RSs with which the terminal performs the frequency estimation, the first processor is configured to:
- determine, according to downlink channel quality, the plurality of TRSs or CSI-RSs with which the terminal performs the frequency estimation; or,
- determine, according to uplink channel quality, the plurality of TRSs or CSI-RSs with which the terminal performs the frequency estimation.

* * * * *